May 12, 1931.  M. G. SCOTT  1,805,017
DOOR OPERATING MECHANISM FOR DELIVERY TRUCKS
Filed May 29, 1929
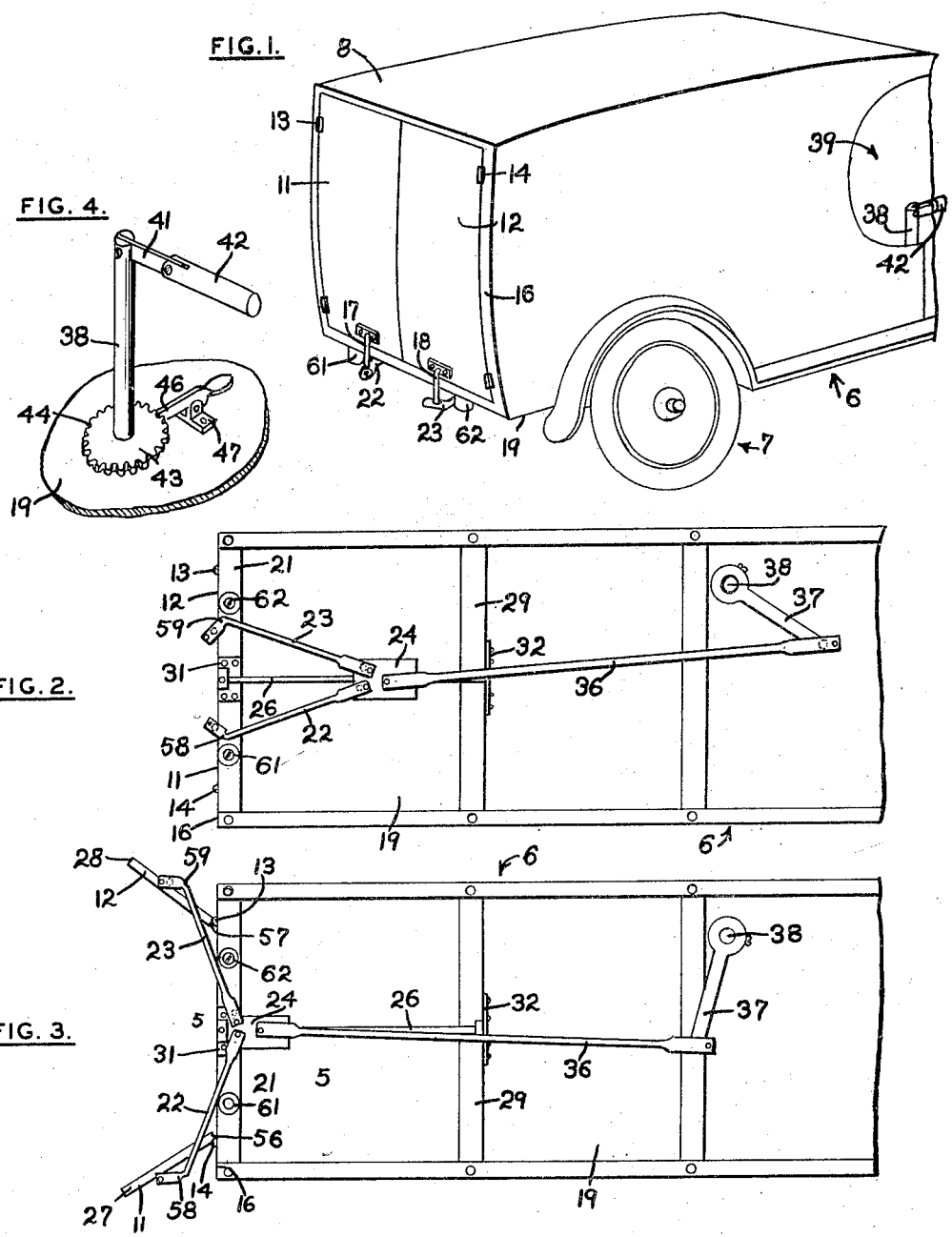
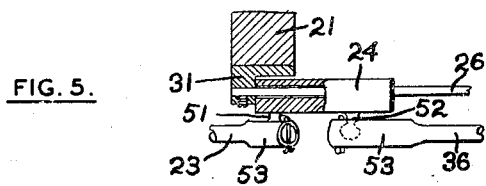
INVENTOR
M. G. SCOTT
BY Hazard and Miller
ATTORNEYS Patented May 12, 1931

1,805,017

UNITED STATES PATENT OFFICE

MALCOLM G. SCOTT, OF LOS ANGELES, CALIFORNIA

DOOR OPERATING MECHANISM FOR DELIVERY TRUCKS

Application filed May 29, 1929. Serial No. 367,097.

This invention relates to vehicle bodies, and has for an object the provision of a novel mechanism for controlling from a remote point, the doors of a vehicle body.

A more detailed object is the provision of means whereby the driver of a vehicle, may without leaving the driver's seat, optionally open or close the doors which are hinged upon the rear of the body of that vehicle.

A further object is the provision of a vehicle door operating mechanism as described, in which means are provided for locking the doors closed to prevent their being opened in any way other than by means of a control device situated adjacent the driver's station.

A further object is the provision of a door actuating mechanism having the general characteristics described, which is capable of operating a pair of doors, each of which is so hung that it is adapted to open by swinging rearwards from the after end of the body and beyond a position of parallelism with the sides of the body, there being means provided for developing a leverage to permit again moving the doors to closed position when the actuating mechanism is reversed.

Another object is the provision of a vehicle door operating mechanism as described, which is of a very simple nature, resulting in its being relatively inexpensive to manufacture and install, and yet which is rugged, with the result that it will continue to operate satisfactorily over a prolonged period of time even though subjected to hard usage, and which, furthermore, is capable of being installed not only upon vehicle bodies during process of manufacture thereof, but also upon those bodies which are already in use, thereby materially widening the range of utility of the present invention.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a perspective view of the rear and side of a vehicle equipped with a delivery body and having the door operating mechanism of my invention installed thereupon;

Fig. 2 is an underneath plan view showing the door operating mechanism in position with the door closed;

Fig. 3 is a view similar to Fig. 2, with the doors moved to fully open position;

Fig. 4 is a perspective view of the portion of the operating mechanism which is accessible to the driver of the vehicle, and by means of which the mechanism is actuated;

Fig. 5 is a compound, vertical sectional view taken upon the lines 5—5 of Fig. 3, with the direction of view as indicated.

Specifically describing the most practical embodiment of the invention of which I am at present aware, it is herein shown and described as being operatively mounted upon a vehicle indicated in its entirety at 6, which comprises running gear 7 having a conventional delivery body 8 mounted thereupon. A pair of doors 11 and 12 are hinged as at 13 and 14 respectively, to the after end 16 of the body 8, in a manner readily understood.

Each door 11 and 12 is provided with a bracket 17 and 18 respectively, extending rigidly downwards therefrom past the bottom 19 of the body, these brackets being preferably secured to the outer face of their respective doors, so that they extend downwards aft of the rear transverse frame member 21. Pivotally connected to the lower end of each bracket 17 and 18, is an arm 22 and 23 respectively, and each of these arms extends angularly forward under the bottom 19 of the body 8, to be pivotally connected to a slipper 24 which is reciprocably mounted upon a guide rod 26 rigid with the under side 19 of the body and extending longitudinally thereof from a point below the free edges 27 and 28 of the doors 11 and 12 respectively. This guide rod 26 may conveniently be mounted by attaching its after end to the rear transverse member 21, and its forward end to the transverse member 29 just forward thereof, suitable brackets or plates 31 and 32 respectively, being employed for that purpose.

A connecting rod 36 is pivotally connected at its after end, to the slipper 24, and at its forward end to a crank 37 which is rigid with the lower end of a shaft 38 which is journalled in and extends upwards through the bottom 19 of the vehicle body to a position closely adjacent the driver's station 39. This shaft 38 has rigid therewith, a handle portion 41 to which is pivotally attached, a second handle portion 42, the purpose being to permit the portion 42 to hang downwards when not in use, and thus occupy a minimum of space and yet permit the portion 42 to be raised into alignment with the portion 41 and thus develop sufficient leverage to facilitate turning the shaft 38 when it is desired to manipulate the doors 11 and 12.

A disc 43 rigid with the shaft 38 adjacent the bottom 19, is provided with a plurality of notches 44 in the periphery thereof, whereby a movable detent 46 which is pivotally mounted within a suitable bracket 47 mounted upon the floor 19, may engage the disc 43 to releasably retain the shaft 38 and other portions of the door operating mechanism in selected position.

While the pivotal connections between the various elements of the door operating mechanism may be of any suitable description, the preferred style is best shown upon Fig. 5, which shows the slipper 24 slidably mounted upon the after end of the guide rod 26 and the arm 23 and the connecting rod 26 pivotally connected to the slipper 24 through the expedient of headed projections 51 and 52 seated within sockets 53 and 54 respectively, carried by the arm 23 and connecting rod 36 respectively. This type of connection constitutes the conventional drag link mechanism, and whereas the specific form thereof forms no portion of the present invention, it is particularly adaptable to the present use.

The parts are so proportioned and arranged that when the doors are fully opened as indicated upon Fig. 3, the arms 23 extend beyond the hinged edges 56 and 57 of the doors 11 and 12 respectively. Furthermore, each of the arms is offset as at 58 and 59 respectively, to such an extent that the forward sides of these arms are adapted to engage projections 61 and 62 respectively, which are rigid with and extend downwards from the after transverse member 21.

Operation

Assuming that the doors are closed as shown upon Fig. 2, the shaft 38 should be turned by means of the handle 41 and after the detent 46 has been moved from engagement with the plate 43. The direction of rotation should be such that the outer end of the crank 37, is moved rearwards of the vehicle, whereby the connecting rod 36 will push the slipper 24 toward the after end of the guide rod 26. The first effect of this rearward movement of this slipper 24, will be to cause the arms 22 and 23 to move straight back, starting the doors 11 and 12 respectively, in opening movement. As the opening movement continues however, the brackets 17 and 18 become separated a greater distance, with the result that the arms 22 and 23 spread at a wider angle. Consequently, as the slipper 24 approaches its after extreme of movement, the arms 22 and 23 separate the doors in a wedging action in the place of a straight pushing action as when opening movement commences. Furthermore, the arms 22 and 23 are of such length that when the slipper 24 has reached its after extreme of movement, the doors 11 and 12 have been moved beyond positions of parallelism with the sides of the body 8. This position is shown upon Fig. 3.

When it is desired to again close the doors 11 and 12, the handle 41 should be turned in the opposite direction, thus pulling the slipper 24 forwards. The first result of this motion of the slipper will be to pull the inner ends of the arms 22 and 23 forward. This will cause the arms to engage the projections 61 and 62 respectively, between their respective points of attachment, to the slipper 24 and to their respective doors 11 and 12, so that the projections 61 and 62 serve as fulcrums about which the arms 22 and 23 pivot in sliding movement, causing the outer ends of the arms 22 and 23 to move rearwards to commence closing action of the doors 11 and 12. When the doors have reached positions of parallelism with the sides of the vehicle, continued closing movement will be effected by straight pulling action of the arms 22 and 23, as the forward motion of the slipper 24 continues.

Obviously, the doors may be locked in either fully open or fully closed position, or in any position intermediate these two extremes, this locking being effected by means of the detent 46 within the driver's compartment. Obviously therefore, when locked closed, there will be no opportunity for the removal of the contents of the vehicle without the knowledge of the driver, as long as the driver remains at his station.

Various changes may be made in the details of the invention as herein described, without departing from the scope thereof as defined by the appended claims.

I claim:

1. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, and means accessible to the driver of the vehicle for reciprocating said slipper.

2. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, a shaft extending upwards through the floor of the vehicle, a crank rigid with said shaft, a connecting rod pivoted at one end to said crank and at the other end to said slipper, and a handle carried by said shaft and accessible to the driver of the vehicle.

3. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, a shaft extending upwards through the floor of the vehicle a crank rigid with said shaft, a connecting rod pivoted at one end to said crank and at the other end to said slipper, a handle carried by said shaft and accessible to the driver of the vehicle, and means for releasably locking said shaft in selected position.

4. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, means accessible to the driver of the vehicle for reciprocating said slipper, said arms extending beyond the hinged edges of the doors when moved to open position, and a pair of projections rigid with said body, each in position to be engaged by the forward side of one of the arms as the slipper starts its door closing motion.

5. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, said arms extending beyond the hinged edges of the doors when moved to open position, a pair of projections rigid with said body, each in position to be engaged by the forward side of one of the arms as the slipper starts its door closing motion, a shaft extending upwards through the floor of the vehicle, a crank rigid with said shaft below the floor of the vehicle, a connecting rod pivoted at one end to said crank and at the other end to said slipper, and a handle carried by said crank accessible to the driver of the vehicle.

6. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, said arms extending beyond the hinged edges of the doors when moved to open position, a pair of projections rigid with said body, each in position to be engaged by the forward side of one of the arms as the slipper starts its door closing motion, a shaft extending upwards through the floor of the vehicle, a crank rigid with said shaft below the floor of the vehicle, a connecting rod pivoted at one end to said crank and at the other end to said slipper, a handle carried by said crank accessible to the driver of the vehicle, and releasable means for locking said shaft in selected position.

7. A device for operating a pair of doors carried upon a vehicle body, comprising a guide rod rigid with the under side of the body and extending longitudinally from a point beneath the free edges of the doors when closed, a slipper reciprocably mounted on said rod, a pair of rigid arms each pivoted at one end to said slipper and at the other end to one of said doors, said arms extending beyond the hinged edges of the doors when moved to open position, a pair of projections rigid with said body, each in position to be engaged by the forward side of one of the arms as the slipper starts its door closing motion, a shaft extending upwards through the floor of the vehicle, a crank rigid with said shaft below the floor of the vehicle, a connecting rod pivoted at one end to said crank and at the other end to said slipper, a folding handle carried by said crank accessible to the driver of the vehicle, and releasable means for locking said shaft in selected position.

In testimony whereof I have signed my name to this specification.

MALCOLM G. SCOTT.